United States Patent
Patnaik

(10) Patent No.: US 11,866,001 B1
(45) Date of Patent: *Jan. 9, 2024

(54) SAFETY CONSIDERATIONS FOR SELF-DRIVING VEHICLES

(71) Applicant: Waymo LLC, Mountain View, CA (US)

(72) Inventor: Vijaysai Patnaik, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/115,976

(22) Filed: Dec. 9, 2020

Related U.S. Application Data

(63) Continuation of application No. 16/190,464, filed on Nov. 14, 2018, now Pat. No. 10,988,110.

(51) Int. Cl.
*B60R 25/102* (2013.01)
*G08G 1/127* (2006.01)
(Continued)

(52) U.S. Cl.
CPC .......... *B60R 25/102* (2013.01); *B60R 25/305* (2013.01); *B60R 25/31* (2013.01);
(Continued)

(58) Field of Classification Search
CPC ..... B60R 25/102; B60R 25/31; B60R 25/305; G08G 1/165; G08G 1/127; G05D 1/0214;
(Continued)

(56) References Cited

U.S. PATENT DOCUMENTS 7,586,401 B2 * 9/2009 Payne ................... B60R 25/33
701/519
8,595,037 B1 11/2013 Hyde et al.
(Continued)

OTHER PUBLICATIONS

Boumiza, et al., "Intrusion Threats and Security Solutions for Autonomous Vehicle Networks", 2017 IEEE/ACS 14th International Conference on Computer Systems and Applications, 2017, 8 pages.
(Continued)

*Primary Examiner* — Babar Sarwar
(74) *Attorney, Agent, or Firm* — Botos Churchill IP Law

(57) ABSTRACT

The technology relates to detection of aberrant driving situations during operation of a vehicle in an autonomous driving mode. Aberrant situations may include potential theft or unsafe conditions, which are determined according to one or more signals. The signals are derived from information detected about the environment around the vehicle, such as from one or more sensors disposed on the vehicle. In response to an aberrant situation, the vehicle may take various corrective action, such as rerouting, locking down the vehicle or communicating with remote assistance. The type of corrective action taken may depend on a type of cargo being transported or whether one or more passengers are in the vehicle. If there are passengers, the system may communicate with the passengers via the passenger's client computing devices or by presenting visual or audible information via a user interface system of the vehicle.

23 Claims, 15 Drawing Sheets

(51) Int. Cl.
  *B60R 25/31* (2013.01)
  *G08G 1/16* (2006.01)
  *B60R 25/30* (2013.01)
  *B60W 30/09* (2012.01)
  *G05D 1/02* (2020.01)
  *G05D 1/00* (2006.01)

(52) U.S. Cl.
  CPC ............ *G08G 1/127* (2013.01); *G08G 1/165* (2013.01); *B60W 30/09* (2013.01); *B60W 2420/52* (2013.01); *G05D 1/0088* (2013.01); *G05D 1/0214* (2013.01); *G05D 1/0246* (2013.01)

(58) Field of Classification Search
  CPC ... G05D 1/0088; G05D 1/0246; B60W 30/09; B60W 2420/52
  See application file for complete search history.

(56) References Cited

U.S. PATENT DOCUMENTS

| | | | | |
|---|---|---|---|---|
| 8,779,948 | B2* | 7/2014 | Faus | G08G 1/20 340/689 |
| 9,592,795 | B1* | 3/2017 | Whiteside | G01S 19/13 |
| 9,783,159 | B1 | 10/2017 | Potter et al. | |
| 9,865,019 | B2 | 1/2018 | Bogovich et al. | |
| 9,886,841 | B1* | 2/2018 | Nave | B60W 50/14 |
| 9,940,676 | B1 | 4/2018 | Biemer | |
| 10,988,110 | B1* | 4/2021 | Patnaik | G08G 1/096811 |
| 2001/0005217 | A1* | 6/2001 | Hamilton | G07C 5/008 348/148 |
| 2002/0061758 | A1* | 5/2002 | Zarlengo | G01D 21/00 455/517 |
| 2002/0121969 | A1* | 9/2002 | Joao | B60R 25/102 340/425.5 |
| 2002/0145666 | A1* | 10/2002 | Scaman | G07C 5/008 348/148 |
| 2003/0160692 | A1* | 8/2003 | Nonaka | B60R 25/104 340/5.2 |
| 2004/0124697 | A1* | 7/2004 | MacGregor | B60T 17/18 180/271 |
| 2004/0188164 | A1* | 9/2004 | Maeno | B60R 25/1004 180/287 |
| 2005/0203683 | A1* | 9/2005 | Olsen | G08G 1/042 701/29.3 |
| 2006/0038664 | A1* | 2/2006 | Park | B60R 25/102 340/693.1 |
| 2006/0250501 | A1* | 11/2006 | Widmann | G08B 13/19695 348/148 |
| 2007/0005609 | A1* | 1/2007 | Breed | G01S 5/0072 |
| 2007/0014439 | A1* | 1/2007 | Ando | G08B 31/00 382/118 |
| 2008/0309487 | A1* | 12/2008 | Chao | G08B 13/06 340/542 |
| 2013/0033381 | A1* | 2/2013 | Breed | G08B 13/2417 340/568.1 |
| 2013/0229289 | A1* | 9/2013 | Bensoussan | B60Q 1/52 340/902 |
| 2014/0309860 | A1* | 10/2014 | Paulin | B60B 3/165 73/146 |
| 2016/0362084 | A1 | 12/2016 | Martin et al. | |
| 2017/0053169 | A1* | 2/2017 | Cuban | G05D 1/104 |
| 2017/0308098 | A1 | 10/2017 | Yu et al. | |
| 2017/0352256 | A1* | 12/2017 | Miwa | G06K 19/10 |
| 2018/0052463 | A1 | 2/2018 | Mays | |
| 2018/0108369 | A1* | 4/2018 | Gross | G06N 3/084 |
| 2018/0290621 | A1* | 10/2018 | Seaman | B60R 25/104 |
| 2018/0297781 | A1* | 10/2018 | Alkhaldi | G06Q 10/083 |
| 2018/0330622 | A1* | 11/2018 | Liang | G05D 1/0291 |
| 2018/0364738 | A1* | 12/2018 | Bridges | G05D 1/0217 |
| 2019/0073735 | A1* | 3/2019 | Conlon | H04L 67/535 |
| 2019/0135598 | A1* | 5/2019 | Agarwal | G05D 1/0246 |
| 2019/0137991 | A1* | 5/2019 | Agarwal | G01C 21/383 |
| 2019/0202400 | A1* | 7/2019 | Shimizu | G08B 25/10 |
| 2020/0001827 | A1* | 1/2020 | Shirazi | G08B 13/19647 |
| 2020/0133288 | A1* | 4/2020 | Abari | G05D 1/0088 |
| 2020/0150668 | A1* | 5/2020 | Lacaze | G05D 1/0219 |

OTHER PUBLICATIONS

Fox, Justin, "Cybercrime and Vehicle Theft", StaySafeOnline, Available online at: < https://staysafeonline.org/blog/cybercrime-vehicle-theft/>, Jun. 29, 2017, 4 pages.

Hameed, et al., "Mobility Based Surveillance Model to Facilitate Security of Individuals' Properties", 2013 International Conference on Advanced Computer Science Applications and Technologies, 2013, 5 pages.

Harvey, John M., "The Secure Networked Truck Protecting America's Transportation Infrastructure", IEEE, 2004, 2004, pp. 5281-5284.

Mcginley, Alexander, "Driverless Trucks and Transportation Insurance", 2017 Annual IMUA Meeting, 2017, 33 pages.

Petit, et al., "Potential Cyberattacks on Automated Vehicles", IEEE Transactions on Intelligent Transportation Systems, vol. 16, No. 2, Apr. 2015, Apr. 2015, pp. 546-556.

Unnisa, et al., "Obstacle Detection for Self Driving Car in Pakistan's Perspective", 2018 International Conference on Computing, Mathematics and Engineering Technologies—iCoMET 2018, 2018, 8 pages.

\* cited by examiner

100

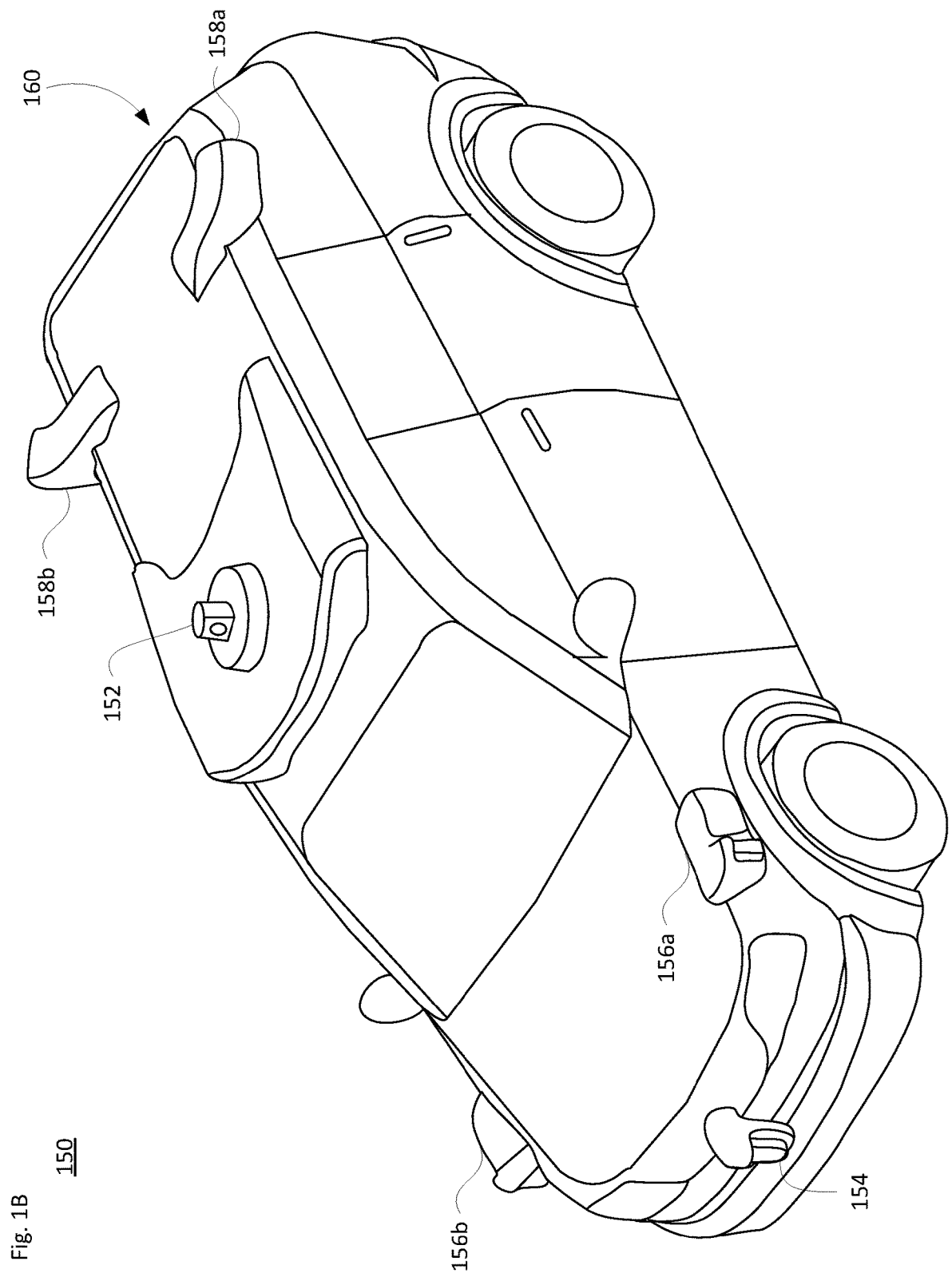

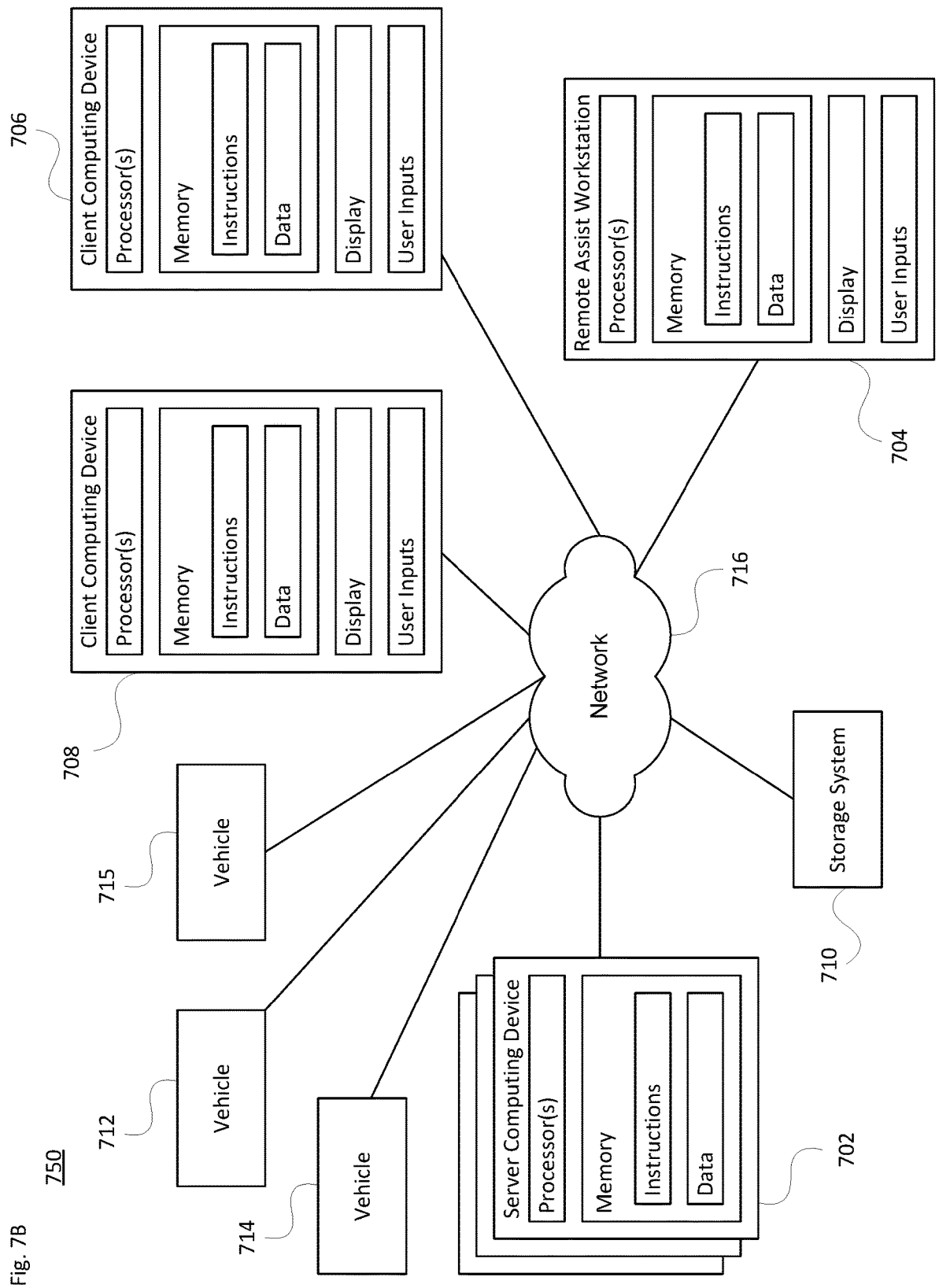

SAFETY CONSIDERATIONS FOR SELF-DRIVING VEHICLES

CROSS-REFERENCE TO RELATED APPLICATIONS

This application is a continuation of U.S. application Ser. No. 16/190,464, filed Nov. 14, 2018, the entire disclosure of which is incorporated herein by reference.

BACKGROUND

Autonomous vehicles, such as vehicles that do not require a human driver, can be used to aid in the transport of trailered (e.g., towed) cargo, such as freight, livestock or other items from one location to another. Such vehicles may operate in a fully autonomous mode or a partially autonomous mode where a person may provide some driving input. Cargo theft has been a concern for conventional transportation with a human driver, and is expected to continue to be a concern in semi- or fully-autonomous transportation.

BRIEF SUMMARY

Aspects of the technology relate to detecting aberrant driving situations for a self-driving vehicle, such as a possible theft of cargo. Once detected, the self-driving vehicle may determine options for corrective action and select a particular action to take.

According to one aspect, a vehicle is configured to operate in an autonomous driving mode. Here, the vehicle comprises a driving system, a perception system, a communication system and a control system. The driving system includes a steering subsystem, an acceleration subsystem and a deceleration subsystem to control driving of the vehicle in the autonomous driving mode. The perception system includes one or more sensors configured to detect objects in an environment external to the vehicle. The communication system is configured to provide wireless connectivity with one or more remote devices. The control system includes one or more processors. The control system is operatively coupled to the driving system, the communication system and the perception system. The control system is configured to receive sensor data from the perception system and obtained by the one or more sensors, and to evaluate the sensor data. The sensor data is evaluated to determine whether an aberrant situation exists in the environment external to the vehicle, including to check for one or more signals indicative of an atypical behavior relative to an expected behavior for the external environment. Upon detection of the aberrant situation, the control system is configured perform at least one of transmit information about the aberrant situation to a remote assistance service using the communication system, transmit information about the aberrant situation to an emergency service, or take corrective action via the driving system.

In one example, the corrective action includes maneuvering to avoid the aberrant situation in the autonomous driving mode. In another example, the corrective action includes maneuvering to avoid the aberrant situation in accordance with information received from the remote assistance service. The expected behavior may be either location-dependent or situation-dependent.

In one scenario, the check for one or more signals indicative of an atypical behavior relative to an expected behavior for the external environment includes evaluation of a position or arrangement of at least one person, other vehicle or debris in the external environment relative to a current location of the vehicle. The information about the aberrant situation may include one or more of a still image, Lidar data, a video image or an audio segment captured by a sensor of the perception system.

The vehicle may further comprise a secure data storage system in operative communication with the control system. Here, the control system is further configured to store the information about the aberrant situation in the secure data storage system.

Upon detection of the aberrant situation, the control system may be further configured to determine whether the aberrant situation is a permissible aberrant situation or an impermissible aberrant situation. In this case, the control system is configured to determine whether the aberrant situation is the permissible aberrant situation or an impermissible aberrant situation based on a confidence level of the aberrant situation.

In another example, the control system is configured to select a specific type of corrective action based on a type of cargo being transported by the vehicle. In a further example, the vehicle is a cargo vehicle. Here, the control system is configured to activate one or more location sensors on cargo upon detection of the aberrant situation.

And the vehicle may further comprise a user interface subsystem operatively coupled to the control system. In this case, upon detection of the aberrant situation, the control system is further configured to provide status information to one or more passengers of the vehicle via the user interface subsystem.

According to another aspect, a method of operating a vehicle in an autonomous driving mode is provided. The method comprises receiving, by a control system, sensor data from one or more sensors of a perception system of the vehicle; evaluating, by the control system, the received sensor data to determine whether an aberrant situation exists in an environment external to the vehicle, including checking for one or more signals indicative of an atypical behavior relative to an expected behavior for the external environment; and upon detection of the aberrant situation, the control system performing at least one of transmitting information about the aberrant situation to a remote assistance service via a communication system of the vehicle, transmitting information about the aberrant situation to an emergency service, or taking corrective action via a driving system of the vehicle.

In one example, the corrective action includes maneuvering to avoid the aberrant situation in the autonomous driving mode. In another example, the corrective action includes maneuvering to avoid the aberrant situation in accordance with information received from the remote assistance service.

Checking for one or more signals indicative of an atypical behavior relative to an expected behavior for the external environment may include evaluating a position or arrangement of at least one person, other vehicle or debris in the external environment relative to a current location of the vehicle.

Upon detection of the aberrant situation, the method may include determining whether the aberrant situation is a permissible aberrant situation or an impermissible aberrant situation.

The method may further comprise selecting a specific type of corrective action based on a type of cargo being transported by the vehicle.

In one example, the vehicle is a cargo vehicle. Here the method further includes activating one or more location sensors on cargo upon detection of the aberrant situation.

And in another example, upon detection of the aberrant situation, the method further comprises providing status information to one or more passengers of the vehicle via a user interface subsystem of the vehicle.

BRIEF DESCRIPTION OF THE DRAWINGS

FIG. 1B illustrates an example passenger vehicle arrangement for use with aspects of the technology.

FIGS. 7A-B illustrate an exemplary assistance configuration in accordance with aspects of the disclosure.

DETAILED DESCRIPTION

The technology relates to a monitoring system for self-driving vehicles that is capable of detecting potential cargo thefts and other aberrant situations. Such technology is form-factor agnostic, meaning that it is applicable to autonomous trucks and other cargo vehicles, as well as passenger vehicles. In conjunction with detecting aberrant situations, the system can redirect the self-driving vehicle along an alternate route or otherwise take corrective action. Relevant authorities can be alerted as needed.

EXAMPLE VEHICLE SYSTEMS

Figure 1A:
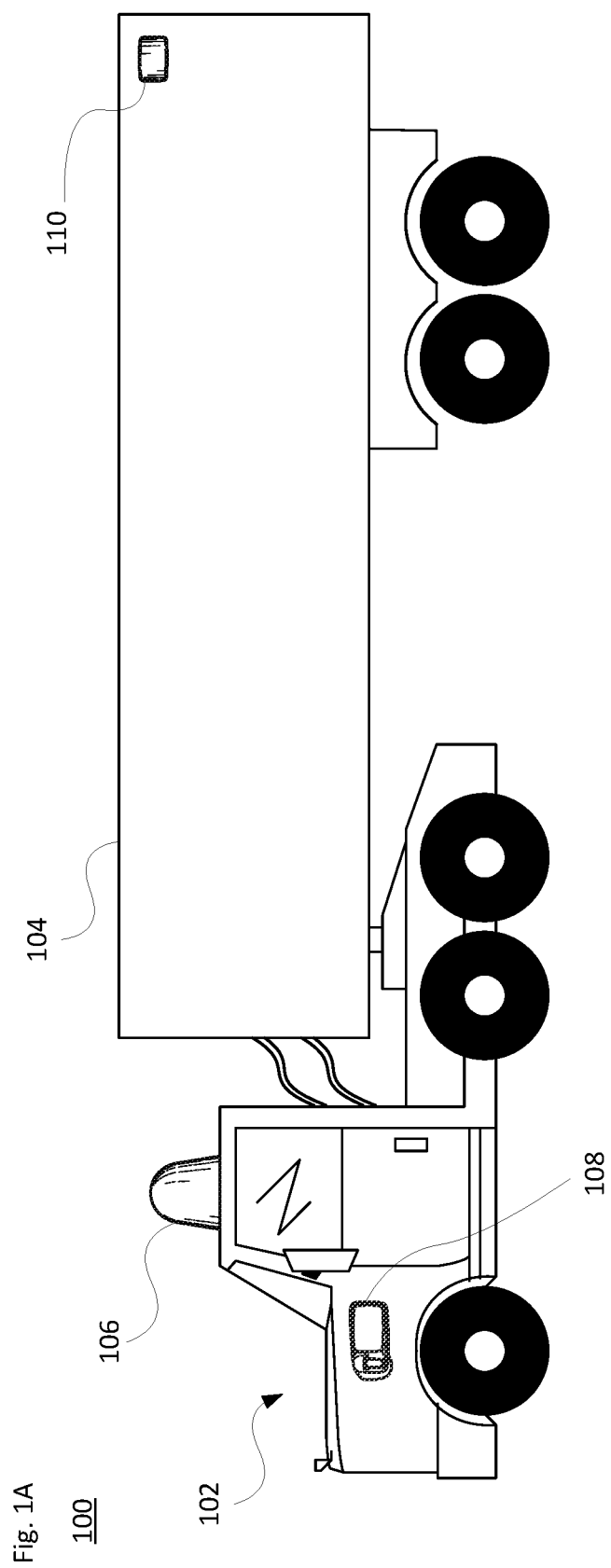
FIG. 1A illustrates an example cargo vehicle arrangement for use with aspects of the technology.

FIG. 1A illustrates an example cargo vehicle 100, such as a tractor-trailer truck, and FIG. 1B illustrates an example passenger vehicle 150, such as a minivan. The cargo vehicle 100 may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the freight or other type of cargo (e.g., livestock) to be transported. The tractor unit 102 includes the engine and steering systems (not shown) and a cab 106 for a driver and any passengers. In a fully autonomous arrangement, the cab 106 may not be equipped with seats or manual driving components, since no person may be necessary.

The trailer 104 includes a hitching point, known as a kingpin. The kingpin is configured to pivotally attach to the tractor unit. In particular, the kingpin attaches to a trailer coupling, known as a fifth-wheel, that is mounted rearward of the cab. Sensor units may be deployed along the tractor unit 102 and/or the trailer 104. The sensor units are used to detect information about the surroundings around the cargo vehicle 100. For instance, as shown the tractor unit 102 may include a roof-mounted sensor assembly 106 and one or more side sensor assemblies 108, and the trailer 104 may employ one or more sensor assemblies 110, for example mounted on the left and/or right sides of the trailer 104. In some examples, the tractor unit 102 and trailer 104 also may include other various sensors for obtaining information about the tractor unit 102's and/or trailer 104's interior spaces.

Similarly, the passenger vehicle 150 may include various sensors for obtaining information about the vehicle's external environment. For instance, a roof-top housing 152 may include a Lidar sensor as well as various cameras and/or radar units. Housing 154, located at the front end of vehicle 150, and housings 156a, 156b on the driver's and passenger's sides of the vehicle may each incorporate a Lidar or other sensor. For example, housing 156a may be located in front of the driver's side door along a quarterpanel of the vehicle. As shown, the passenger vehicle 150 also includes housings 158a, 158b for radar units, Lidar and/or cameras also located towards the rear roof portion of the vehicle. Additional Lidar, radar units and/or cameras (not shown) may be located at other places along the vehicle 100. For instance, arrow 160 indicates that a sensor unit may be positioned along the read of the vehicle 150, such as on or adjacent to the bumper. In some examples, the passenger vehicle 150 also may include various sensors for obtaining information about the vehicle 150's interior spaces.

While certain aspects of the disclosure may be particularly useful in connection with specific types of vehicles, the vehicle may be any type of vehicle including, but not limited to, cars, trucks, motorcycles, buses, recreational vehicles, etc.

Figure 2A:
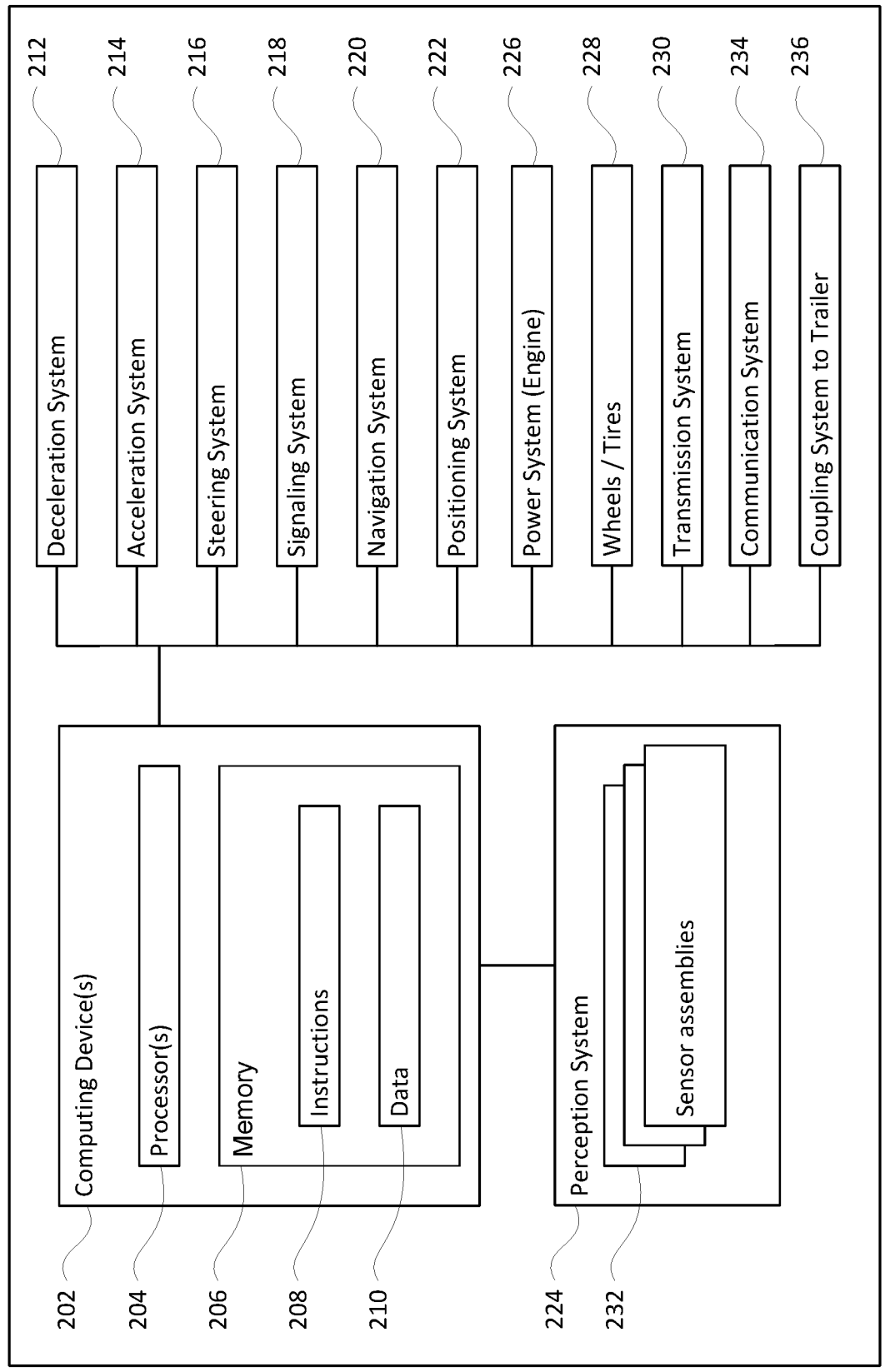
FIGS. 2A-B are functional diagrams of an example tractor-trailer vehicle in accordance with aspects of the disclosure.

FIG. 2A illustrates a block diagram 200 with various components and systems of a cargo vehicle, such as a truck, farm equipment or construction equipment, configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As shown in the block diagram of FIG. 2A, the vehicle includes a control system of one or more computing devices, such as computing devices 202 containing one or more processors 204, memory 206 and other components typically present in general purpose computing devices. The control system may constitute an electronic control unit (ECU) of a tractor unit or other computing system of the vehicle. The memory 206 stores information accessible by the one or more processors 204, including instructions 208 and data 210 that may be executed or otherwise used by the processor 204. The memory 206 may be of any type capable of storing information accessible by the processor, including a computing device-readable medium. The memory is a non-transitory medium such as a hard-drive, memory card, optical disk, solid-state, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The one or more processor 204 may be any conventional processors, such as commercially available CPUs. Alternatively, the one or more processors may be a dedicated device such as an ASIC or other hardware-based processor. Although FIG. 2A functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, returning to FIG. 2A, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle).

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a tractor-trailer truck or a construction vehicle, the steering system 216 may include components to control the angle of wheels of the tractor unit 102 to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 224 also includes sensors for detecting objects external to the vehicle. The detected objects may be other vehicles, obstacles in the roadway, traffic signals, signs, trees, etc. For example, the perception system 224 may include one or more light detection and ranging (Lidar) sensors, sonar devices, radar units, cameras (e.g., optical and/or infrared), inertial sensors (e.g., gyroscopes or accelerometers), and/or any other detection devices that record data which may be processed by computing devices 202. The sensors of the perception system 224 may detect objects and their characteristics such as location, orientation, size, shape, type (for instance, vehicle, pedestrian, bicyclist, etc.), heading, and speed of movement, etc. The raw data from the sensors and/or the aforementioned characteristics can sent for further processing to the computing devices 202 periodically and continuously as it is generated by the perception system 224. Computing devices 202 may use the positioning system 222 to determine the vehicle's location and perception system 224 to detect and respond to objects when needed to reach the location safely. In addition, the computing devices 202 may perform calibration of individual sensors, all sensors in a particular sensor assembly, or between sensors in different sensor assemblies.

As indicated in FIG. 2A, the sensors of the perception system 224 may be incorporated into one or more sensor assemblies 232. In one example, the sensor assemblies 232 may be arranged as sensor towers integrated into the side-view mirrors on the truck, farm equipment, construction equipment or the like. Sensor assemblies 232 may also be positioned at different locations on the tractor unit 102 or on the trailer 104 (see FIG. 1A), or along different portions of passenger vehicle 150 (see FIG. 1B). The computing devices 202 may communicate with the sensor assemblies located on both the tractor unit 102 and the trailer 104 or distributed along the passenger vehicle 150. Each assembly may have one or more types of sensors such as those described above.

Also shown in FIG. 2A is a communication system 234 and a coupling system 236 for connectivity between the tractor unit and the trailer. The coupling system 236 includes a fifth-wheel at the tractor unit and a kingpin at the trailer. The communication system 234 may include one or more wireless network connections to facilitate communication with other computing devices, such as passenger computing devices within the vehicle, and computing devices external to the vehicle, such as in another nearby vehicle on the roadway or at a remote network. The network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 2B:
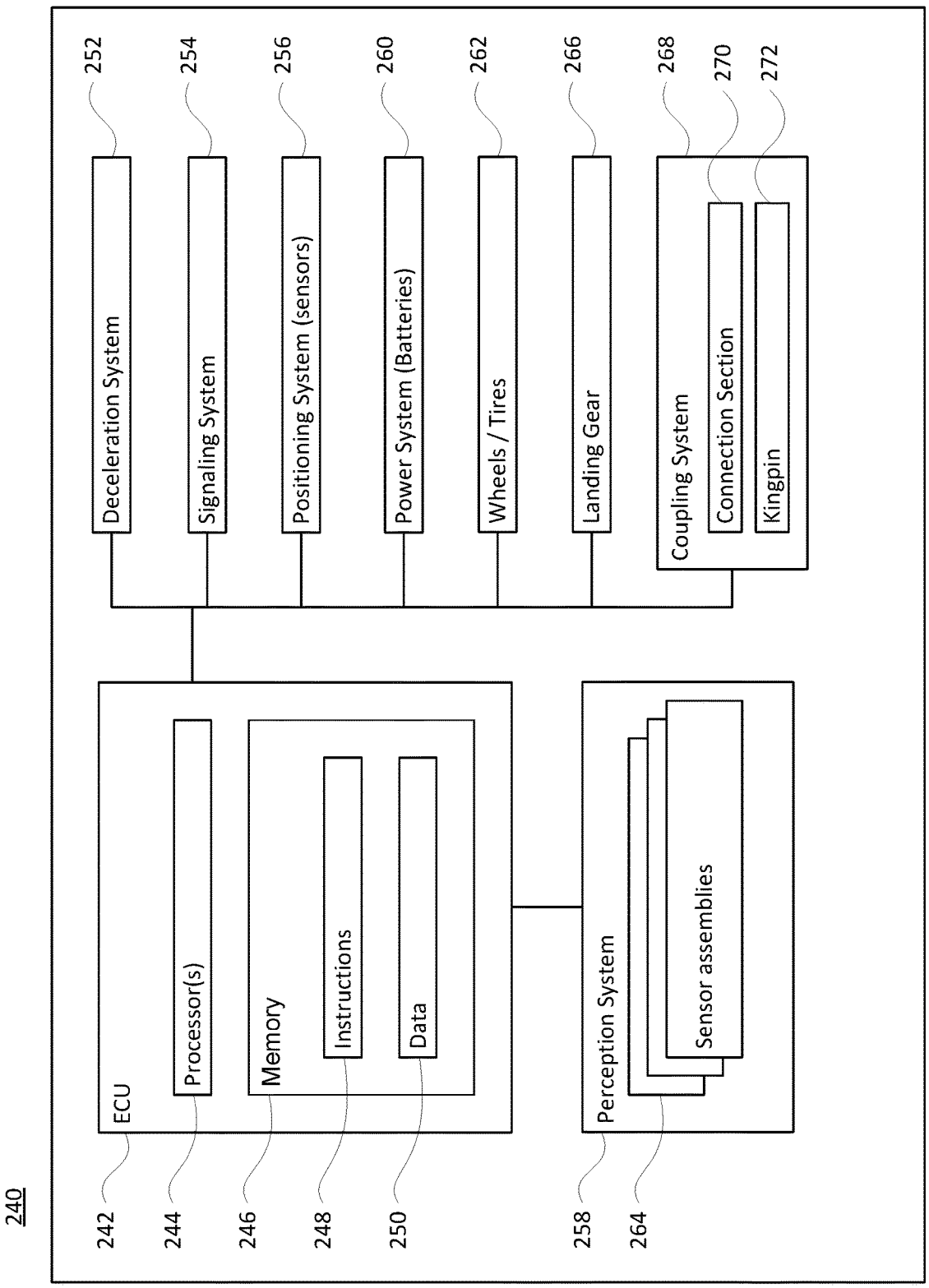

FIG. 2B illustrates a block diagram 240 of an example trailer. As shown, the system includes an ECU 242 of one or more computing devices, such as computing devices containing one or more processors 244, memory 246 and other components typically present in general purpose computing devices. The memory 246 stores information accessible by the one or more processors 244, including instructions 248 and data 250 that may be executed or otherwise used by the processor(s) 244. The descriptions of the processors, memory, instructions and data from FIG. 2A apply to these elements of FIG. 2B.

The ECU 242 is configured to receive information and control signals from the trailer unit. The on-board processors 244 of the ECU 242 may communicate with various systems of the trailer, including a deceleration system 252 (for controlling braking of the trailer), signaling system 254 (for controlling turn signals), and a positioning system 256 (for determining the position of the trailer). The ECU 242 may also be operatively coupled to a perception system 258 (for detecting objects in the trailer's environment) and a power system 260 (for example, a battery power supply) to provide power to local components. Some or all of the wheels/tires 262 of the trailer may be coupled to the deceleration system 252, and the processors 244 may be able to receive information about tire pressure, balance, wheel speed and other factors that may impact driving in an autonomous mode, and to relay that information to the processing system of the tractor unit. The deceleration system 252, signaling system 254, positioning system 256, perception system 258, power system 260 and wheels/tires 262 may operate in a manner such as described above with regard to FIG. 2A. For instance, the perception system 258, if employed as part of the trailer, may include at least one sensor assembly 264 having one or more Lidar sensors, sonar devices, radar units, cameras, inertial sensors, and/or any other detection devices that record data which may be processed by the ECU 242 or by the processors 204 of the tractor unit.

The trailer also includes a set of landing gear 266, as well as a coupling system 268. The landing gear 266 provide a support structure for the trailer when decoupled from the tractor unit. The coupling system 268, which may be a part of coupling system 236 of the tractor unit, provides connectivity between the trailer and the tractor unit. The coupling system 268 may include a connection section 270 to provide backward compatibility with legacy trailer units that may or may not be capable of operating in an autonomous mode. The coupling system includes a kingpin 272 configured for enhanced connectivity with the fifth-wheel of an autonomous-capable tractor unit.

Figure 3:
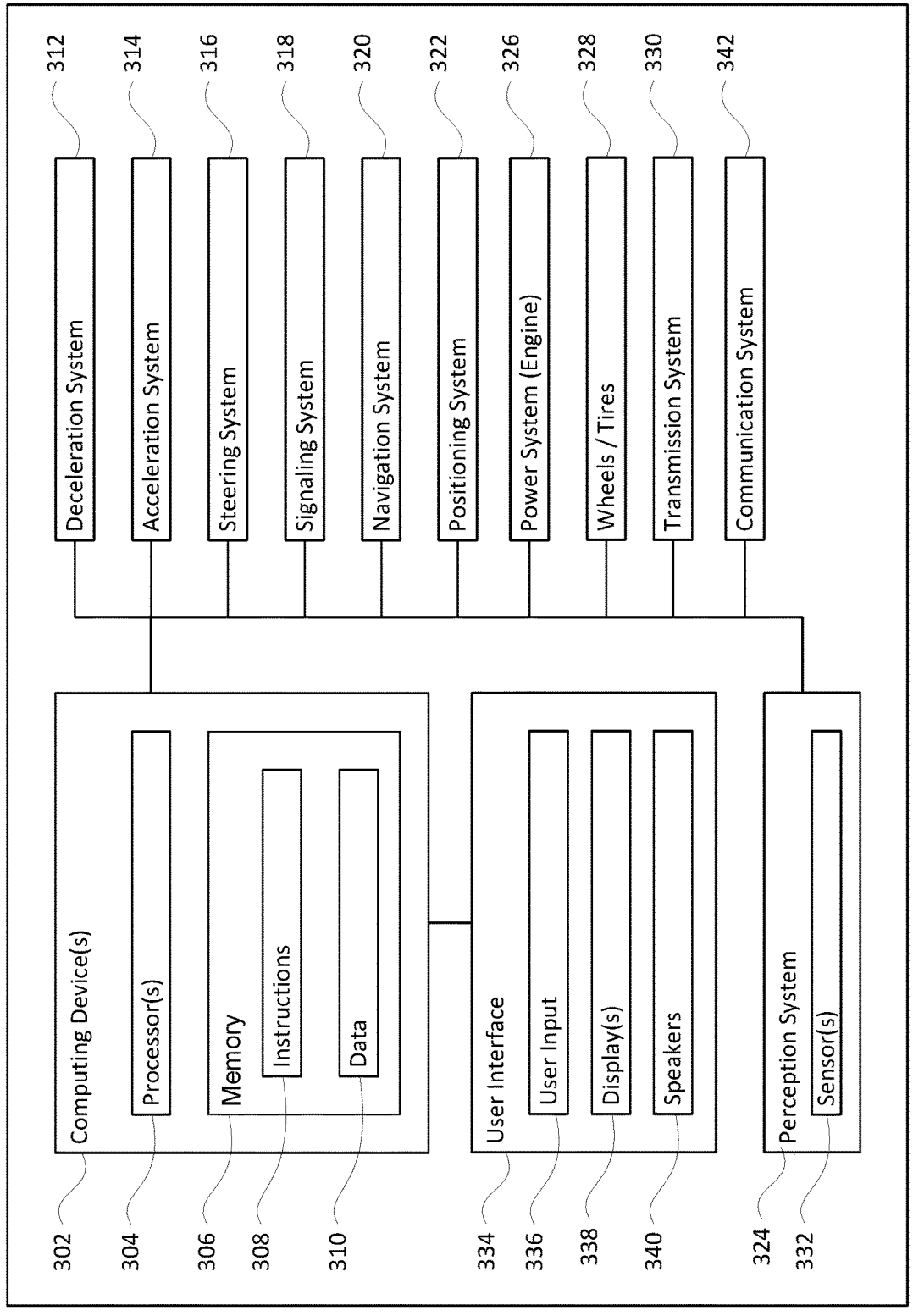
FIG. 3 is a function diagram of an example passenger vehicle in accordance with aspects of the disclosure.

FIG. 3 illustrates a block diagram 300 of various systems of a passenger vehicle. As shown, the system includes one or more computing devices 302, such as computing devices containing one or more processors 304, memory 306 and other components typically present in general purpose computing devices. The memory 306 stores information accessible by the one or more processors 304, including instructions 308 and data 310 that may be executed or otherwise used by the processor(s) 304. The descriptions of the processors, memory, instructions and data from FIG. 2A apply to these elements of FIG. 3.

As with the computing devices 202 of FIG. 2A, the computing devices 302 of FIG. 3 may control computing devices of an autonomous driving computing system or incorporated into a passenger vehicle. The autonomous driving computing system may be capable of communicating with various components of the vehicle in order to control the movement of the passenger vehicle according to primary vehicle control code of memory 306. For example, computing devices 302 may be in communication with various, such as deceleration system 312, acceleration system 314, steering system 316, signaling system 318, navigation system 320, positioning system 322, perception system 324, power system 326 (e.g., the vehicle's engine or motor), transmission system 330 in order to control the movement, speed, etc. of the in accordance with the instructions 208 of memory 306. The wheels/tires 328 may be controlled directly by the computing devices 302 or indirectly via these other systems. These components and subsystems may operate as described above with regard to FIG. 2A. For instance, the perception system 324 also includes one or more sensors 332 for detecting objects external to the vehicle. The sensors 332 may be incorporated into one or more sensor assemblies as discussed above.

Computing devices 202 may include all of the components normally used in connection with a computing device such as the processor and memory described above as well as a user interface subsystem 334. The user interface subsystem 334 may include one or more user inputs 336 (e.g., a mouse, keyboard, touch screen and/or microphone) and various electronic displays 338 (e.g., a monitor having a screen or any other electrical device that is operable to display information). In this regard, an internal electronic display may be located within a cabin of the passenger vehicle (not shown) and may be used by computing devices 302 to provide information to passengers within the vehicle. Output devices, such as speaker(s) 340 may also be located within the passenger vehicle.

The passenger vehicle also includes a communication system 342, which may be similar to the communication system 234 of FIG. 2A. For instance, the communication system 342 may also include one or more wireless network connections to facilitate communication with other computing devices, such as passenger computing devices within the vehicle, and computing devices external to the vehicle, such as in another nearby vehicle on the roadway, or a remote server system. The network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

EXAMPLE IMPLEMENTATIONS

In view of the structures and configurations described above and illustrated in the figures, various implementations will now be described.

The vehicle is configured to detect aberrant situations, which may include, by way of example, possible cargo theft. This may be done by analyzing sensor data received from the various sensors around the vehicle, to determine, for instance, a specific situation or that one or more factors indicate that the situation is aberrant. By way of example, the sensors may detect an unexpected road blockage or pedestrians at a location (e.g., on a highway) where they would not typically be seen. These and other situations are described in detail below.

In order to detect the environment and conditions around the vehicle, different types of sensors and layouts may be employed. Examples of these were discussed above with regard to FIGS. 1A and 1B. The field of view for each sensor can depend on the sensor placement on a particular vehicle. In one scenario, the information from one or more different kinds of sensors may be employed so that the tractor-trailer or passenger vehicle may operate in an autonomous mode. Each sensor may have a different range, resolution and/or field of view (FOV).

For instance, the sensors may include a long range FOV Lidar and a short range FOV Lidar. In one example, the long range Lidar may have a range exceeding 50-250 meters, while the short range Lidar has a range no greater than 1-50 meters. Alternatively, the short range Lidar may generally cover up to 10-15 meters from the vehicle while the long range Lidar may cover a range exceeding 100 meters. In another example, the long range is between 10-200 meters, while the short range has a range of 0-20 meters. In a further example, the long range exceeds 80 meters while the short range is below 50 meters. Intermediate ranges of between, e.g., 10-100 meters can be covered by one or both of the long range and short range Lidars, or by a medium range Lidar that may also be included in the sensor system. In addition to or in place of these Lidars, a set of cameras (e.g., optical and/or infrared) may be arranged, for instance to provide forward, side and rear-facing imagery. Similarly, a set of radar sensors may also be arranged to provide forward, side and rear-facing data.

Figure 4A:
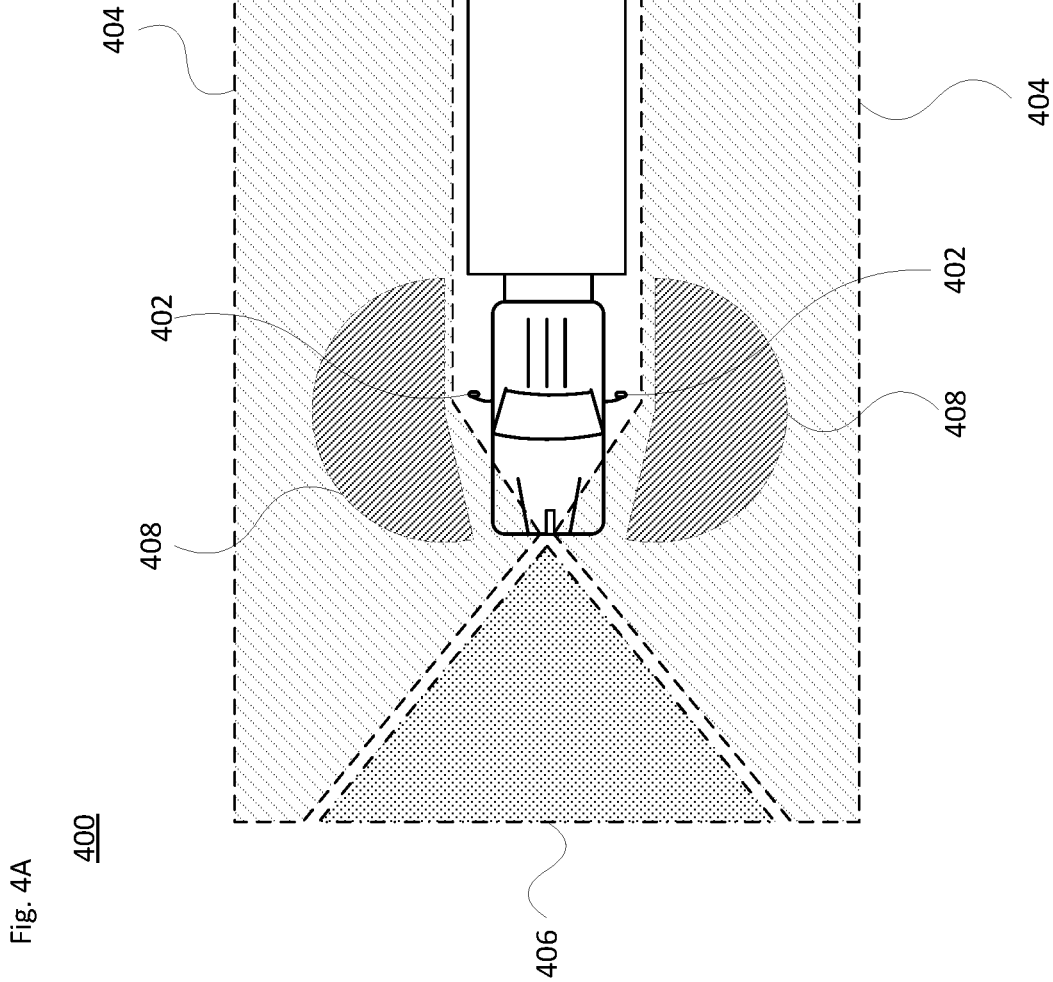
FIGS. 4A-B illustrate example sensor fields of view for use with aspects of the technology.
Figure 4B:
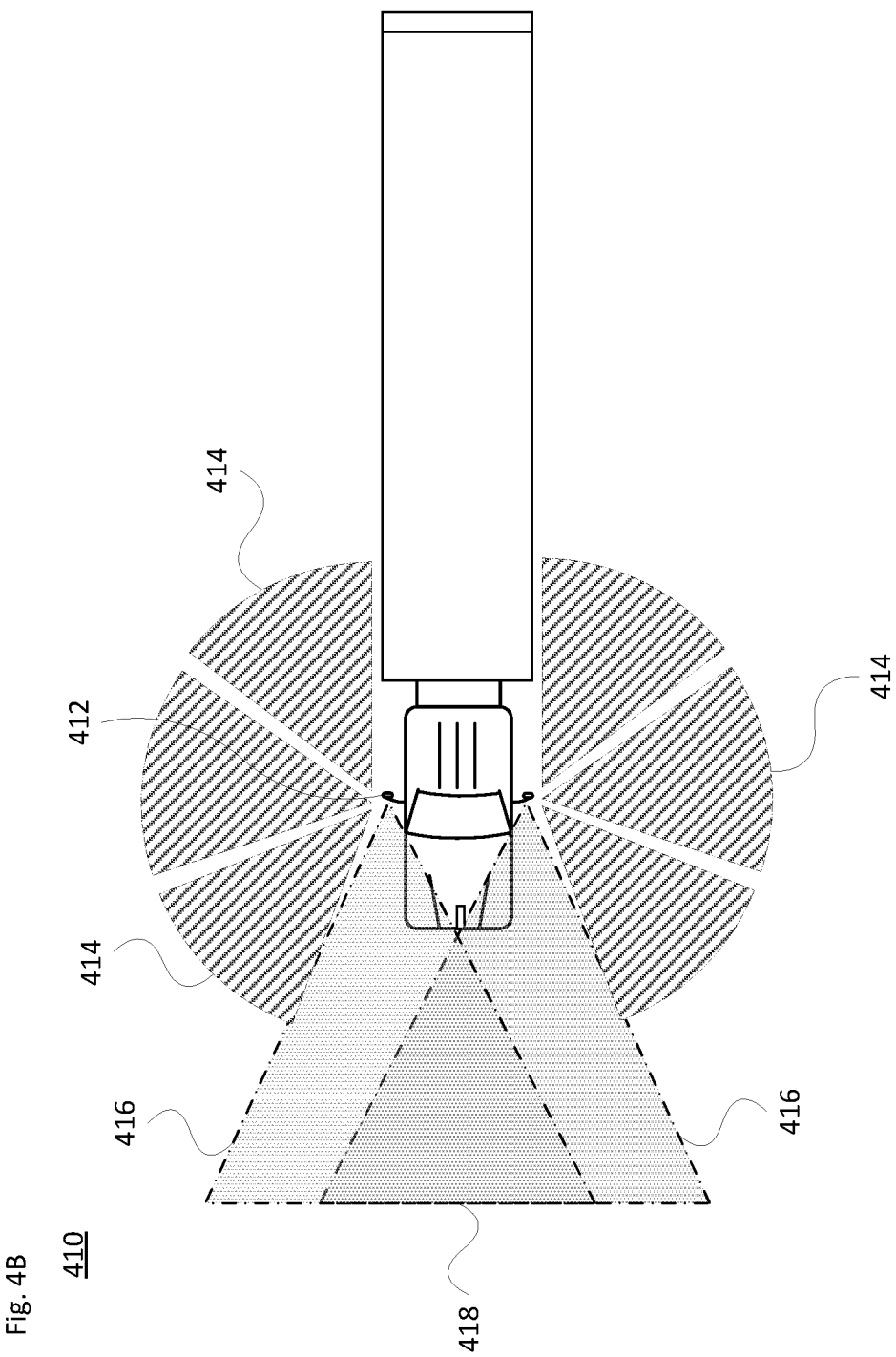

FIGS. 4A-B illustrate example sensor configurations and fields of view on a cargo vehicle. In particular, FIG. 4A presents one configuration 400 of Lidar, camera and radar sensors. In this figure, one or more Lidar units may be located in sensor housing 402. In particular, sensor housings 402 may be located on either side of the tractor unit cab, for instance integrated into a side view mirror assembly. In one scenario, long range Lidars may be located along a top or upper area of the sensor housings 402. For instance, this portion of the housing 402 may be located closest to the top of the truck cab or roof of the vehicle. This placement allows the long range Lidar to see over the hood of the vehicle. And short range Lidars may be located along a bottom area of the sensor housings 402, closer to the ground, and opposite the long range Lidars in the housings. This allows the short range Lidars to cover areas immediately adjacent to the cab. This would allow the perception system to determine whether an object such as another vehicle, pedestrian, bicyclist, etc., is next to the front of the vehicle and take that information into account when determining how to drive or turn in view of an aberrant condition.

As illustrated in FIG. 4A, the long range Lidars on the left and right sides of the tractor unit have fields of view 404. These encompass significant areas along the sides and front of the vehicle. As shown, there is an overlap region 406 of their fields of view in front of the vehicle. A space is shown between regions 404 and 406 for clarity; however in actuality there would desirably be overlapping coverage. The short range Lidars on the left and right sides have smaller fields of view 408. The overlap region 406 provides the perception system with additional or information about a very important region that is directly in front of the tractor unit. This redundancy also has a safety aspect. Should one of the long range Lidar sensors suffer degradation in performance, the redundancy would still allow for operation in an autonomous mode.

FIG. 4B illustrates coverage 410 for either (or both) of radar and camera sensors on both sides of a tractor-trailer. Here, there may be multiple radar and/or camera sensors in each of the sensor housings 412. As shown, there may be sensors with side and rear fields of view 414 and sensors with forward facing fields of view 416. The sensors may be arranged so that the side and rear fields of view 414 overlap, and the side fields of view may overlap with the forward facing fields of view 416. As with the long range Lidars discussed above, the forward facing fields of view 416 also have an overlap region 418. This overlap region provides similar redundancy to the overlap region 406, and has the same benefits should one sensor suffer degradation in performance.

While not illustrated in FIGS. 4A-4B, other sensors may be positioned in different locations to obtain information regarding other areas around the vehicle, such as along the rear or underneath the vehicle.

EXAMPLE SCENARIOS

For situations in which the self-driving vehicle is fully autonomous without a driver being present, it is important that the system not only detect what is going on in the external environment, but also evaluate the environment to determine whether an aberrant situation exists. This can be done by checking for common signals that are indicative of atypical behavior, e.g., from people or other vehicles.

One particularly relevant scenario involves cargo transportation. Here, a fully autonomous truck may be traveling on highways or other roads with expensive, fragile or otherwise precious cargo. Theft of cargo has long been a significant problem in the trucking industry, and that trend may be expected to continue with driverless trucks. In order to address this, the system is capable of detecting the truck's external environment with various sensors such as Lidar, radar, cameras, etc., as discussed above. For instance, the sensors can detect a road blockage, e.g., where all lanes are blocked or there is not enough room for the truck to maneuver around the blockage.

The on-board system can then check for signals that would indicate a potential theft scenario. For example, the system may analyze whether people are present in a place where they would not be expected, such as in the lanes of a highway. Other signals could include the orientation or positioning of other vehicles or other objects blocking the road or otherwise impeding the ability of vehicles to maneuver. The system can use the signals to differentiate a permissible situation (e.g., police car blocking traffic due to an accident) from other situations, e.g., theft or safety.

Other types of relevant signals can include the following. Unexpected or unusual road signs, such as a stop sign or a traffic light on a freeway. The system can evaluate from its own maps or other data, or from information received from a fleet or central depot, whether the road sign should or should not be present.

In addition to people being present on the highway, another signal could be a person (or persons) very close to the self-driving vehicle. A further signal could be an indication that a lock on the trailer is broken. This may be detected by external sensors, such as an optical camera or Lidar, or by a sensor integrated with the lock. The system could also recognize police or other emergency vehicles and determine whether a stopped vehicle is of that type of vehicle. Yet another signal may be multiple tires losing pressure at the same time. This could be compared against visual sensor data of the road surface. Multiple depressurizations could indicate that it wasn't an accidental tire puncture; rather it may have occurred due to a tire blowout strip laid on the roadway.

Once the potential theft situation is detected, the system can operate to reduce the likelihood of theft and take other action. For example, the self-driving truck may contact a centralized security team, a remote assistant or law enforcement about the situation. Real-time sensor information, such as live camera feeds from the truck, can be wirelessly transmitted via one or more communication channels back to a central office or to law enforcement.

There may be times when the aberrant situation is detected and the truck is far away from law enforcement or other assistance. In this case, the sensors (e.g., sensor assemblies 232 or 264 of FIGS. 2A-B, or sensor assemblies 332 of FIG. 3) may record still images, video images or audio to document the situation. By way of example, one or more cameras are able to record still or video images, which may be optical or infrared images. Images or other sensor data from Lidar or radar sensors may also be gathered, in addition to or in lieu of camera images. And microphones or other transducers may collect audio information. This information may be transmitted to a remote system (e.g., cloud-based storage) for backup. The data may also be stored locally in a black-box recorder. Tracking devices on cargo pallets or other items may be activated.

Figure 5A:
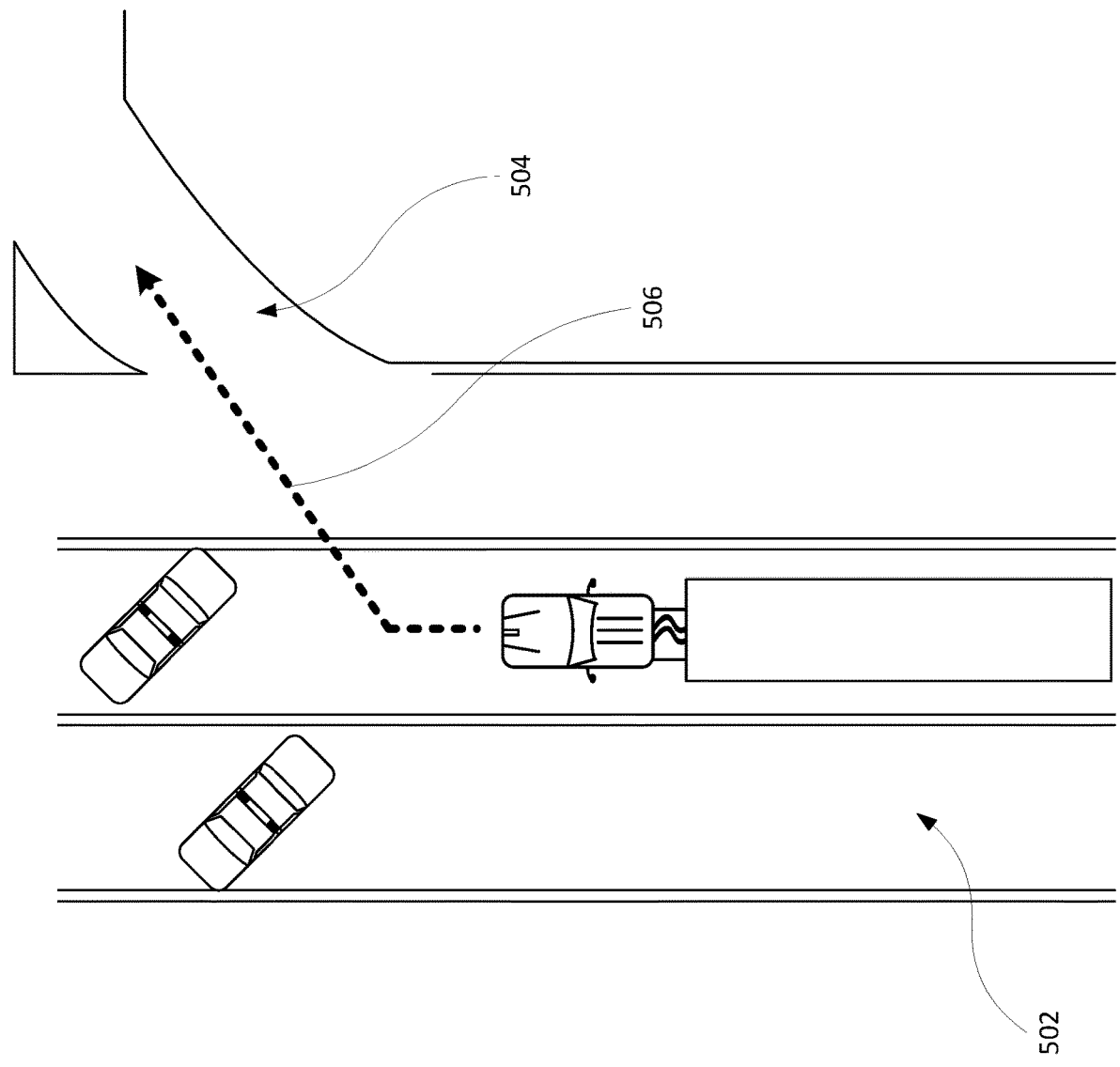
FIGS. 5A-C illustrate exemplary corrective driving scenarios in accordance with aspects of the disclosure.
Figure 5B:
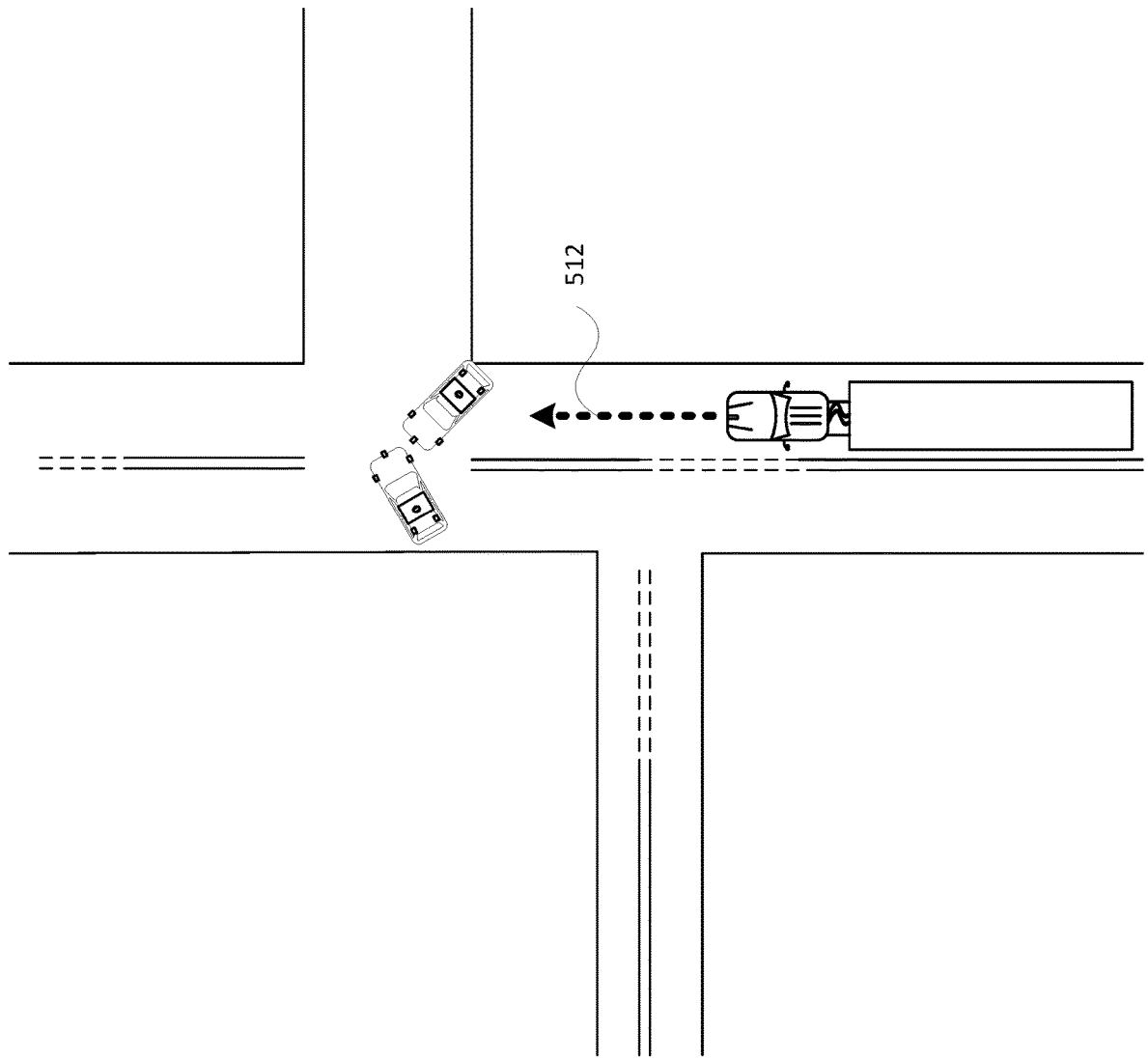
Figure 5C:
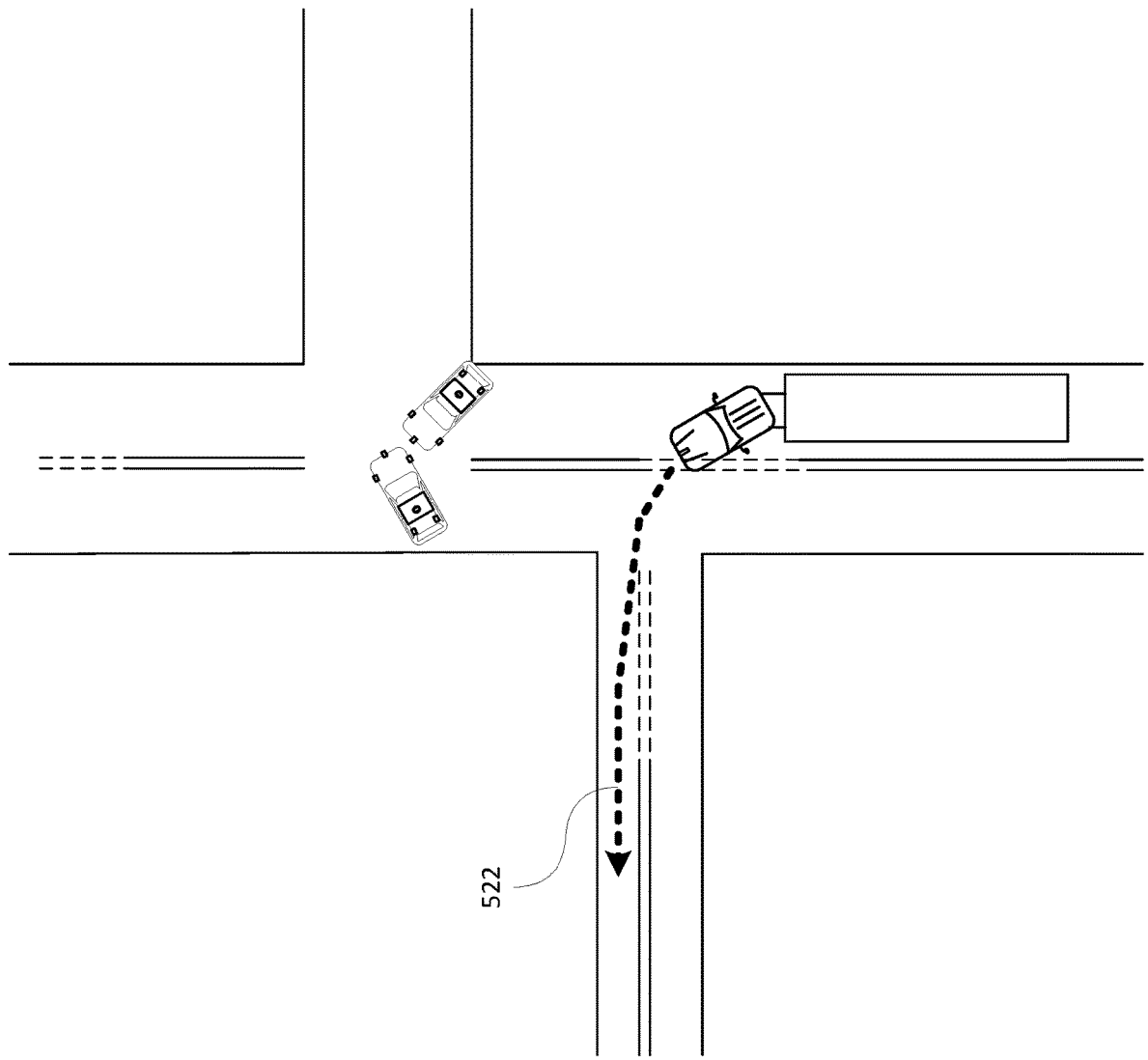

If possible, the truck or other self-driving vehicle may take corrective driving action. For instance, as shown in example 500 of FIG. 5A, if some or all of the driving lanes 502 are blocked on the highway but the shoulder is open or an off-ramp 504 is available, the truck can re-route to maneuver around or otherwise avoid the blockage, for instance by taking the off-ramp as shown by dashed line 506. FIG. 5B illustrates another example 510 of a self-driving truck traveling along a non-highway route. Here, the planned route 512 may be straight, but this route is shown as blocked or otherwise impeded by vehicles. Thus, as seen in FIG. 5C, the truck may reroute along another path 522 to avoid the blockage. In some examples, the rerouting discussed herein may involve backing up, traveling off-road, or other unusual maneuvers. In these cases, the location and/or positioning of the other vehicles on the roadway may be a signal of aberrant behavior, such as an attempt to cause the truck to stop, and not necessarily an accident or other situation.

When remote assistance is available, corrective driving action may be done under the direction of, or by, a person at the remote assistance location. Here, for example, the truck may not typically be authorized to drive autonomously on the shoulder of the highway or on a non-road surface; however, the remote assistance personnel may maneuver the truck remotely or provide such authorization. Thus, in one example the remote assistance personnel may provide an alternative path for the vehicle to follow. In another example, the remote assistance personnel may authorize the vehicle to follow a proposed path planned by the vehicle. In still a further example, the remote assistance personnel may temporarily take over one or more driving operations, for instance until the aberrant situation has been addressed.

An alternative type of corrective action is to automatically deflate one or more tires of the vehicle. Another example of corrective action would be to lower the landing gear of the trailer to prevent the trailer from easily being moved. A further corrective action would be to engage a locking feature between the fifth wheel and kingpin to make it difficult to unhitch the trailer from the truck. Other corrective actions may include locking the vehicle's steering wheel, disabling the gas pedal and/or other pedals, disabling a gear shifting mechanism, etc. Any or all of these types of corrective action could be employed so that the vehicle cannot easily be driven away if a potential theft scenario is detected Another factor to take into account with regard to trucking is the type of cargo that is being transported. For example, is it a fluid or solid, how is the weight distributed in the trailer unit, what is the value of the cargo, is it perishable, etc.?

For certain kinds of cargo, the nature of response by the vehicle could change in accordance with the type of cargo. By way of example, if the truck is carrying sensitive cargo, it might take specific corrective actions when a confidence level of the type of scenario may be low (e.g., on the order of 50%), whereas for other cargo such corrective actions would only be taken if there was a higher (e.g., 75% or higher) confidence level as to the type of scenario.

As noted above, the technology is form-factor agnostic. Similar approaches can be applied to passenger vehicles such as autonomous taxis or buses. When the system detects and determines that the situation is atypical, various steps can be taken. For instance, the vehicle doors may be locked (or remain locked). The windows could be automatically tinted to prevent someone outside the vehicle from seeing into the vehicle. A detour or re-route around the blockage may be taken if possible. The system may proactively inform the authorities and/or other vehicles, for instance if the self-driving vehicle is part of a fleet. And passengers within the vehicle can be alerted or otherwise informed of the situation and the corrective action being taken.

Figure 6A:
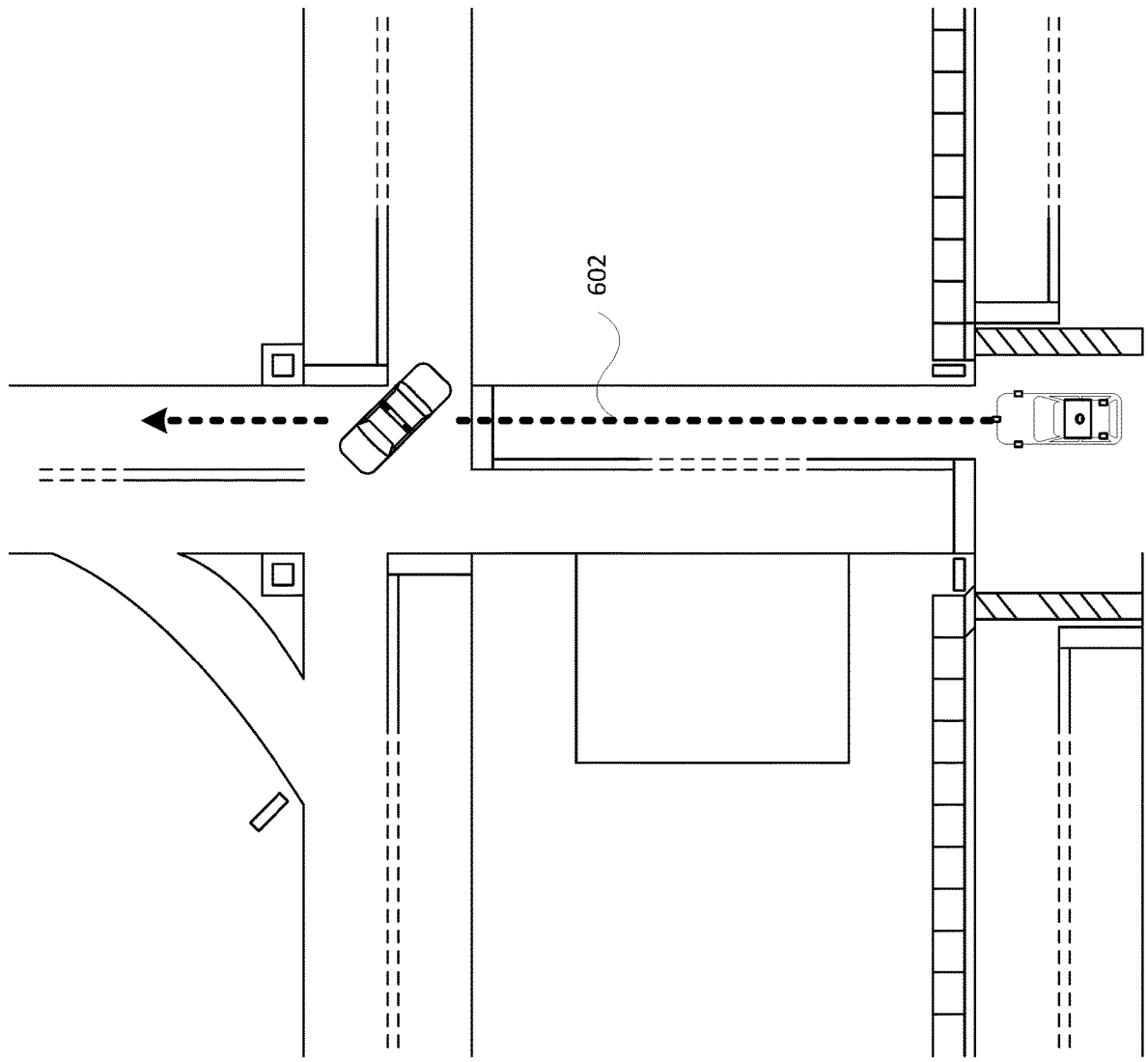
FIGS. 6A-B illustrate another corrective driving scenario in accordance with aspects of the disclosure.
Figure 6B:
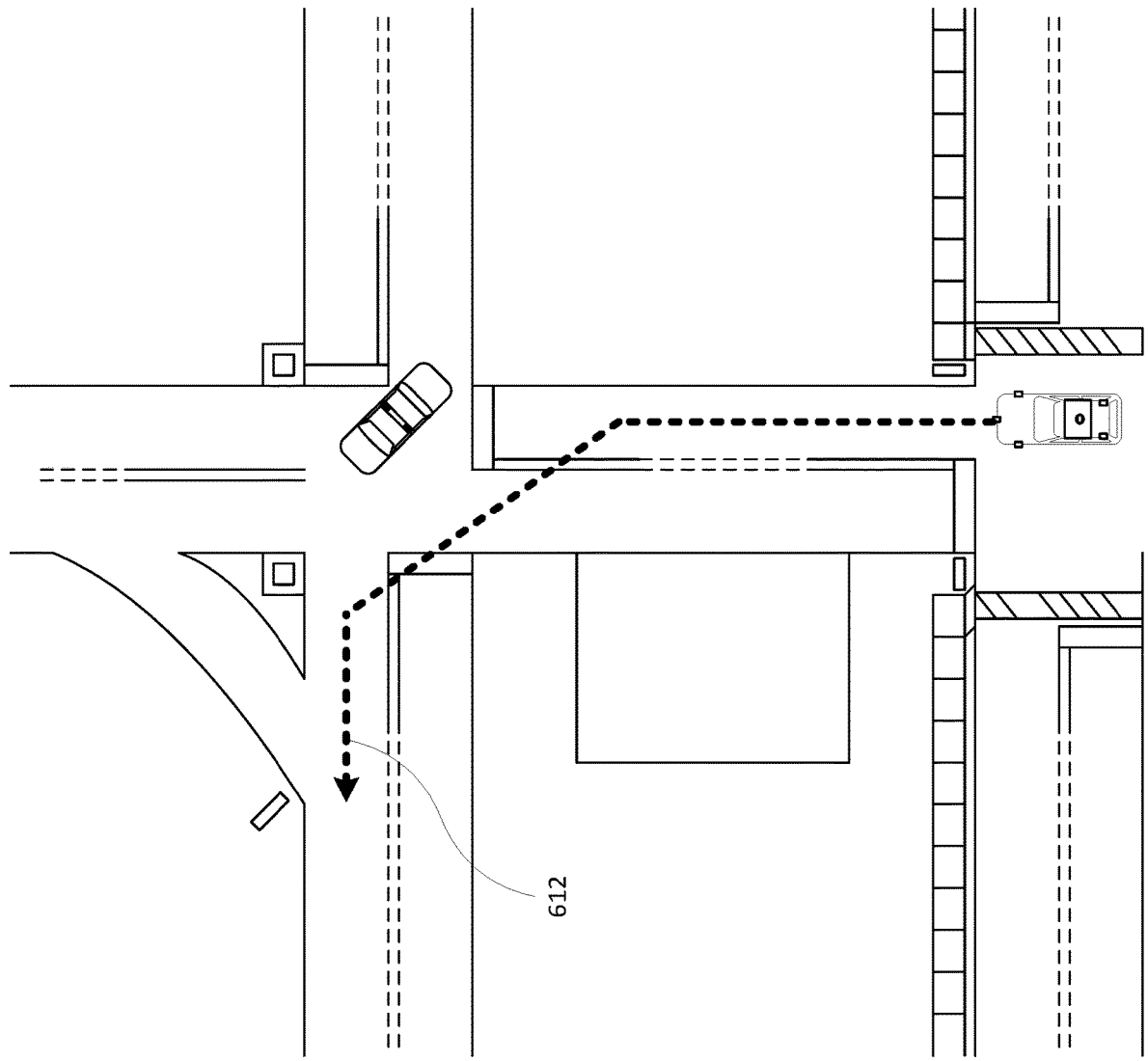

FIGS. 6A and 6B illustrate one example of corrective action for a self-driving passenger vehicle. As shown in view 600 of FIG. 6A, the self-driving vehicle may have a planned route 602 indicated by the dashed line. However, another vehicle (or person, debris, etc.) may block, occlude or otherwise impede the planned route 602. Thus, as shown in FIG. 6B, the self-driving vehicle may determine a new route 612 to avoid the impediment.

Figure 7A:
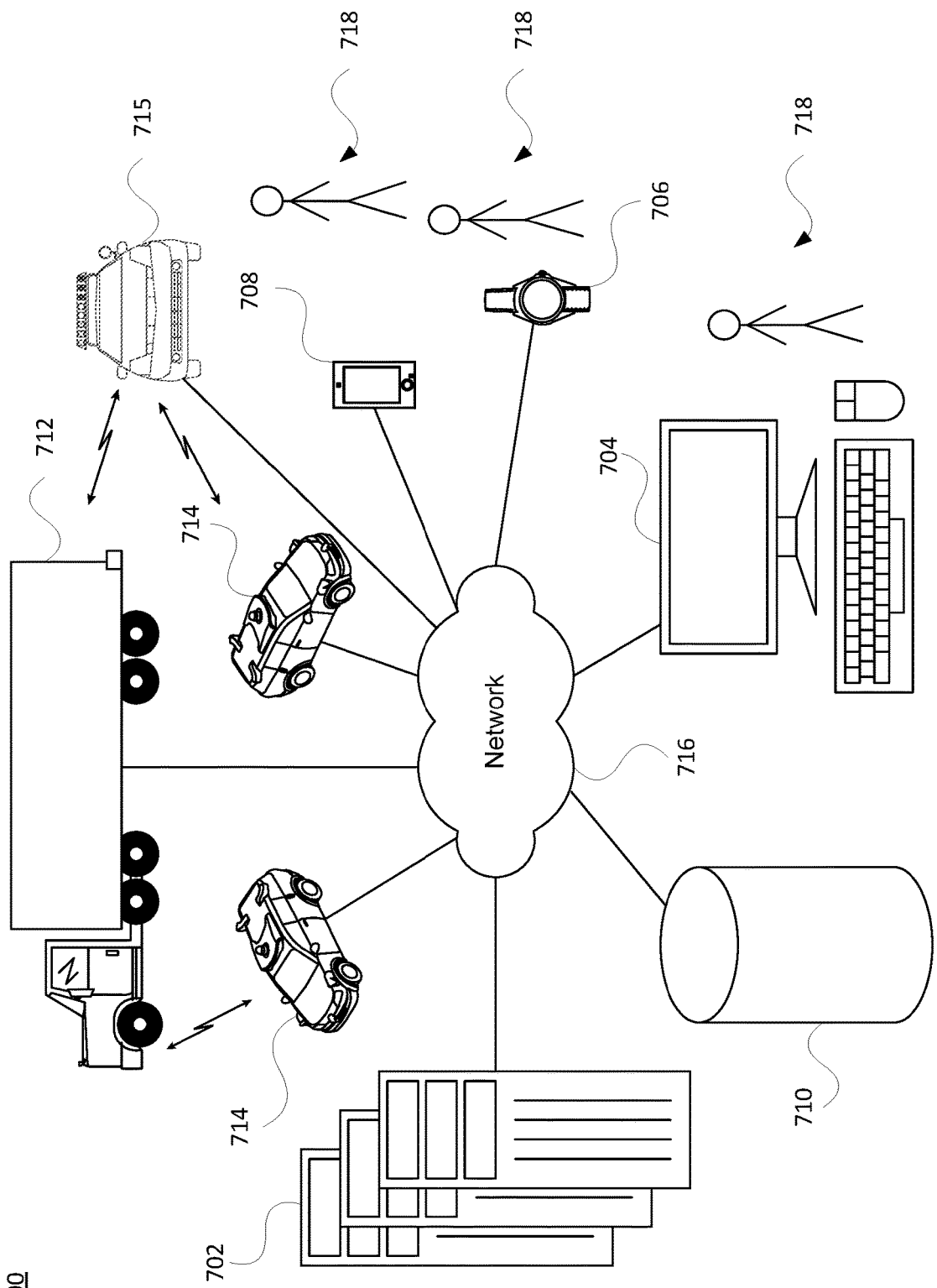

As discussed above, the on-board system may communicate with remote assistance, law enforcement (e.g., police) or other emergency services, and/or with passengers of the vehicle. One example of this is shown in FIGS. 7A and 7B. In particular, FIGS. 7A and 7B are pictorial and functional diagrams, respectively, of an example system 700 that includes a plurality of computing devices 702, 704, 706, 708 and a storage system 710 connected via a network 460. System 700 also includes vehicles 712 and 714, which may be configured the same as or similarly to vehicles 100 and 150 of FIGS. 1A and 1B. Vehicle 712 and/or vehicles 714 may be part of a fleet of vehicles. Also shown is an emergency services vehicle 715, e.g., a police car. Although only a few vehicles and computing devices are depicted for simplicity, a typical system may include significantly more.

As shown in FIG. 7B, each of computing devices 702, 704, 706 and 708 may include one or more processors, memory, data and instructions. Such processors, memories, data and instructions may be configured similarly to the ones described above with regard to FIG. 2A.

The various computing devices and vehicles may communication via one or more networks, such as network 716. The network 716, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 702 may include one or more server computing devices having a plurality of computing devices, e.g., a load balanced server farm, that exchange information with different nodes of a network for the purpose of receiving, processing and transmitting the data to and from other computing devices. For instance, computing device 702 may include one or more server computing devices that are capable of communicating with the computing devices of vehicles 712 and/or 714, as well as computing devices 704, 706 and 708 via the network 716. For example, vehicles 712 and/or 714 may be a part of a fleet of vehicles that can be dispatched by a server computing device to various locations. In this regard, the computing device 702 may function as a dispatching server computing system which can be used to dispatch vehicles to different locations in order to pick up and drop off passengers or to pick up and deliver cargo. The vehicles 715 may also communicate with the dispatching server computing device. In addition, vehicles 712, 714 and/or 715 may also directly or indirectly with other vehicles 712, 714 and/or 715. In addition, server computing device 702 may use network 716 to transmit and present information to a user of one of the other computing devices or a passenger of a vehicle. In this regard, computing devices 704, 706 and 708 may be considered client computing devices.

As shown in FIG. 7A each client computing device 704, 706 and 708 may be a personal computing device intended for use by a respective user 718, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 706 and 708 may mobile phones or devices such as a wireless-enabled PDA, a tablet PC, a wearable computing device (e.g., a smartwatch), or a netbook that is capable of obtaining information via the Internet or other networks.

In some examples, client computing device 704 may be a remote assistance workstation used by an administrator or operator to communicate with passengers as discussed further below. Although only a single remote assistance workstation 704 is shown in FIGS. 7A-7B, any number of such work stations may be included in a given system. Moreover, although operations work station is depicted as a desktop-type computer, operations works stations may include various types of personal computing devices such as laptops, netbooks, tablet computers, etc.

Storage system 710 can be of any type of computerized storage capable of storing information accessible by the server computing devices 702, such as a hard-drive, memory card, ROM, RAM, DVD, CD-ROM, flash drive and/or tape drive. In addition, storage system 710 may include a distributed storage system where data is stored on a plurality of different storage devices which may be physically located at the same or different geographic locations. Storage system 710 may be connected to the computing devices via the network 716 as shown in FIGS. 7A-7B, and/or may be directly connected to or incorporated into any of the computing devices.

Storage system 710 may store various types of information. For instance, the storage system 710 may also store autonomous vehicle control software which is to be used by vehicles, such as vehicles 712 or 714, to operate such vehicles in an autonomous driving mode. Storage system 710 may store various types of information as described in more detail below. This information may be retrieved or otherwise accessed by a server computing device, such as one or more server computing devices 702, in order to perform some or all of the features described herein.

For instance, storage system 710 may store log data. This log data may include, for instance, sensor data generated by a perception system, such as the perception systems of vehicles 712 or 714. As an example, the sensor data may include raw sensor data as well as data identifying defining characteristics of perceived objects (including other road users) such as shape, location, orientation, speed, etc. of objects such as vehicles, pedestrians, bicyclists, vegetation, curbs, lane lines, sidewalks, crosswalks, buildings, etc. The log data may also include "event" data identifying different types of events such as collisions or near collisions with other objects, planned trajectories describing a planned geometry and/or speed for a potential path of the vehicle, actual locations of the vehicles at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, power, etc.) of the vehicle at different times including logged errors, inputs to and outputs of the various systems of the vehicle at different times, etc. As such, these events and the sensor data may be used to "recreate" the vehicle's environment, including perceived objects, and behavior of a vehicle in a simulation. The sensor data may also be used by the server 702 to detect anomalous or otherwise aberrant situations, such as potential theft situations for cargo vehicle 712.

At least some of this log data may be "ride data," that is, log data generated during a particular trip or ride taken by a passenger in an autonomous vehicle such as vehicle 714. Ride data may include all of the aforementioned features of the log data or may include only specific types of data such as motion planning commands from a vehicle's planner system, telemetry from the vehicle, context from the map information used to control the vehicle, processed or raw sensor data for other road users (such as vehicles, bicyclists, pedestrians, etc.) from the vehicle's perception system, acceleration information, jerk (or the derivative of acceleration) information, etc. Ride data may also be associated with ride feedback provided by one or more passengers for a particular ride As discussed above, the self-driving vehicle may communication with remote assistance in order to handle aberrant situations. For instance, should the vehicle determine that it has encountered an aberrant situation, it may send a query and/or data to remote assistance. The query may include a request for an updated route, authorization to modify the current route, additional information regarding the aberrant situation, etc. The data may include raw and/or processed sensor data, vehicle log data and the like. For instance, it may include one or more still images, video and/or an audio segment(s).

In conjunction or alternatively to communicating with remote assistance, the vehicle may communicate with law enforcement (e.g., police) or other emergency services. This may be occur, for example, when a determination has been made from various signal information that a cargo vehicle has encountered a potential theft situation or unsafe situation when passengers are in the vehicle. Various responses or actions may be taken as discussed above, including securing the vehicle and/or taking corrective driving action, for instance which modifies or deviates from a planned route.

In a situation where there are passengers, the vehicle or remote assistance may communicate directly or indirectly with the passengers' client computing device. Here, for example, information may be provided to the passengers regarding the current situation, actions being taken or to be taken in response to the situation, etc.

Figure 8:
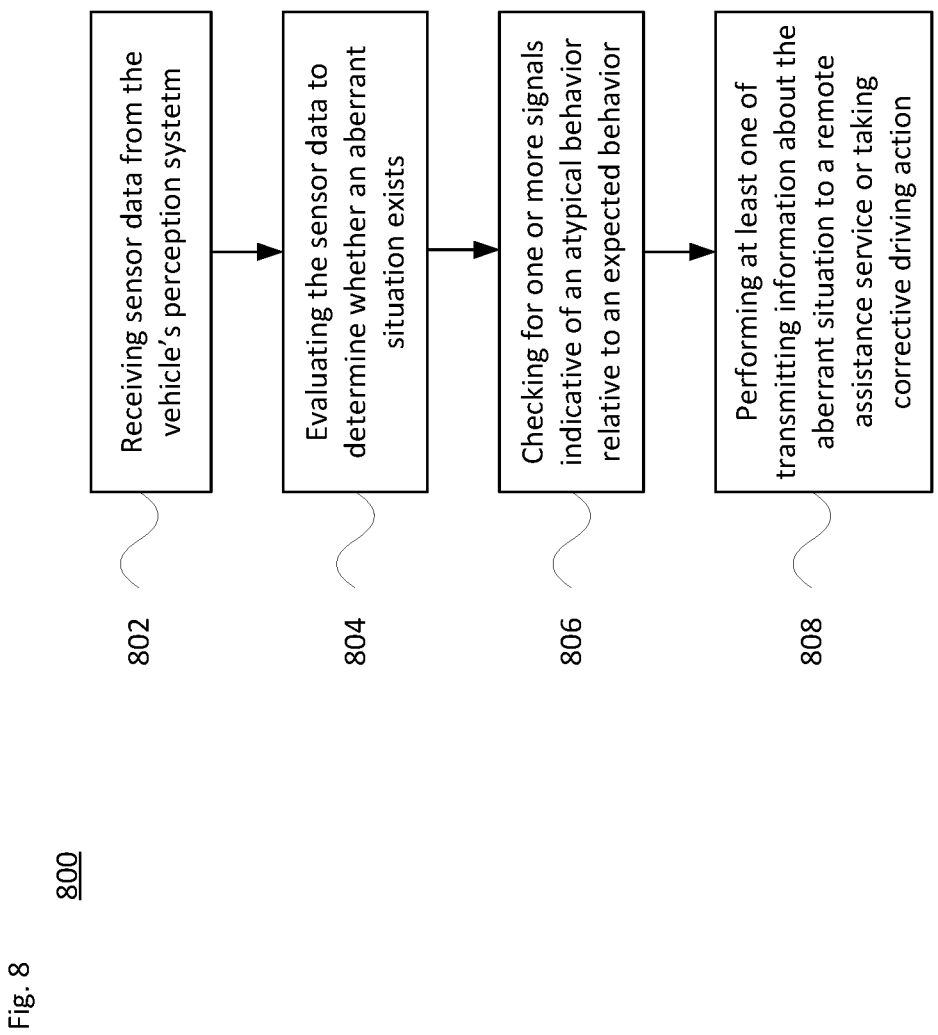
FIG. 8 illustrates an example method of operating a vehicle in accordance with aspects of the technology.

FIG. 8 illustrates an example 800 of a method of operating a vehicle in an autonomous driving mode in view of the above. For instance, as shown in block 802, sensor data is received from the vehicle's perception system. In block 804, the sensor data is evaluated to determine whether an aberrant situation exists. Per block 806, this may involve checking for one or more signals indicative of an atypical behavior relative to an expected behavior. For example, are one or more cars or other vehicles stopped on the roadway in a manner that would indicate a potential theft situation rather than traffic or an accident. Then, as shown in block 808, in view of this, performing at least one of (i) transmitting information about the aberrant situation to a remote assistance service, or (ii) taking corrective driving action. The latter may include, e.g., altering a planned route, pulling over, exiting a roadway, locking down the vehicle, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A vehicle configured to operate in an autonomous driving mode, the vehicle comprising:
  a driving system including a steering subsystem, an acceleration subsystem and a deceleration subsystem to control driving of the vehicle in the autonomous driving mode;
  a perception system including one or more sensors configured to detect an external object in an environment external to the vehicle, the external object including at least one of a person, another vehicle, or an object along a roadway upon which the vehicle is operating;
  a control system including one or more processors, the control system operatively coupled to the driving system and the perception system, the control system being configured to:
    receive sensor data from the perception system and obtained by the one or more sensors, the sensor data indicating a position or a location of the external object;
    evaluate the position or the location of the external object to determine whether an observed situation in the environment external to the vehicle is a permissible situation or an impermissible situation;
    when the observed situation is evaluated to be the permissible situation, cause the driving system to perform a first action; and
    when the observed situation is evaluated to be the impermissible situation, cause the driving system to perform a second action different from the first action.

2. The vehicle of claim 1, wherein the permissible situation is an emergency situation and the impermissible situation is a theft or safety situation.

3. The vehicle of claim 1, wherein when the observed situation is evaluated to be the impermissible situation, the second action is a corrective action that includes maneuvering away from the impermissible situation in the autonomous driving mode.

4. The vehicle of claim 1, wherein the control system is further configured to analyze whether the external object is exhibiting a behavior matching an expected behavior.

5. The vehicle of claim 4, wherein the expected behavior is either location-dependent or situation-dependent.

6. The vehicle of claim 1, wherein the evaluating includes evaluation of a position or arrangement of the external object relative to a current location of the vehicle.

7. The vehicle of claim 6, wherein the evaluating includes evaluation of a proximity of the external object relative to the current location of the vehicle.

8. The vehicle of claim 1, wherein determination whether the observed situation in the environment external to the vehicle is a permissible situation or an impermissible situation further includes evaluation of a component of the vehicle.

9. The vehicle of claim 8, wherein evaluation of the component of the vehicle includes a determination that a lock on a trailer of the vehicle is broken.

10. The vehicle of claim 8, wherein evaluation of the component of the vehicle includes a determination whether one or more tires of the vehicle have reduced pressurization relative to a baseline pressurization.

11. The vehicle of claim 1, wherein determination whether the observed situation in the environment external to the vehicle is a permissible situation or an impermissible situation includes determination of whether an unexpected or unusual road sign has been detected.

12. The vehicle of claim 11, wherein determination of whether the unexpected or unusual road sign has been detected includes evaluation of stored map data, information received from another vehicle, or information received from a remote assistance service.

13. The vehicle of claim 1, further comprising a communication system configured to provide wireless connectivity with one or more remote devices, wherein:
when the observed situation is evaluated to be the impermissible situation, the control system causes the vehicle to perform the second action in accordance with information received from a remote assistance service via the communication system.

14. The vehicle of claim 1, wherein the control system is configured to determine whether the observed situation is the permissible situation or the impermissible situation based on a confidence level of the observed situation.

15. The vehicle of claim 1, wherein the control system is configured to select either the first action or the second action based on a type of cargo being transported by the vehicle.

16. The vehicle of claim 1, wherein the second action performed by the driving system includes a re-routing maneuver.

17. The vehicle of claim 1, wherein the second action performed by the driving system is a locking action of one or more components of the driving system or a locking action of a fifth wheel and a kingpin of the vehicle.

18. A method of operating a vehicle in an autonomous driving mode, wherein the autonomous vehicle comprises a driving system including a steering subsystem, an acceleration subsystem and a deceleration subsystem to control driving of the vehicle in the autonomous driving mode, the method comprising:
receiving, by a control system, sensor data from one or more sensors of a perception system of the vehicle, the sensor data indicating a position or a location of an external object in an external environment external to the vehicle, the external object including at least one of a person, another vehicle, or an object along a roadway upon which the vehicle is operating;
evaluating the position or the location of the external object to determine whether an observed situation in the environment external to the vehicle is a permissible situation or an impermissible situation;
when the observed situation is evaluated to be the permissible situation, causing the driving system of the vehicle to perform a first action; and
when the observed situation is evaluated to be the impermissible situation, causing the driving system of the vehicle to perform a second action different from the first action.

19. The method of claim 18, wherein when the observed situation is evaluated to be the impermissible situation, the second action is a corrective action that includes maneuvering away from the impermissible situation in the autonomous driving mode.

20. The method of claim 18, further comprising analyzing whether the external object is exhibiting a behavior matching an expected behavior.

21. The method of claim 20, wherein the expected behavior is either location-dependent or situation-dependent.

22. The method of claim 18, wherein the evaluating includes evaluating a position or arrangement of the external object relative to a current location of the vehicle.

23. The method of claim 18, wherein when the observed situation is evaluated to be the impermissible situation, the method further comprises at least one of transmitting information about the impermissible situation to a remote assistance service or transmitting information about the impermissible situation to an emergency service.

* * * * *